Figures 1, 2:
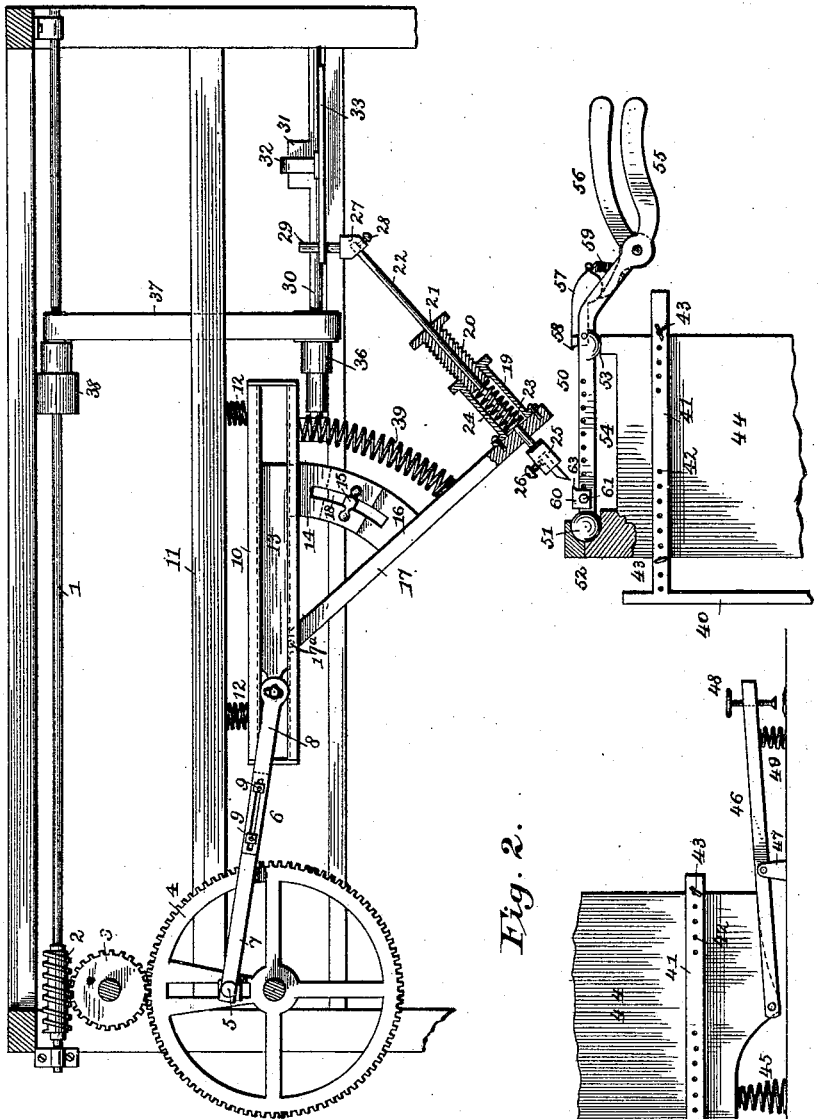

(No Model.) 3 Sheets—Sheet 1.

R. C. MILLER.
CARVING MACHINE.

No. 479,653. Patented July 26, 1892.

Witnesses
Chas. H. Durand
Wm. Bagger

Inventor
Russell C. Miller
By his Attorneys,
C. A. Snow & Co.

(No Model.)  R. C. MILLER.  3 Sheets—Sheet 2.
CARVING MACHINE.
No. 479,653.  Patented July 26, 1892.
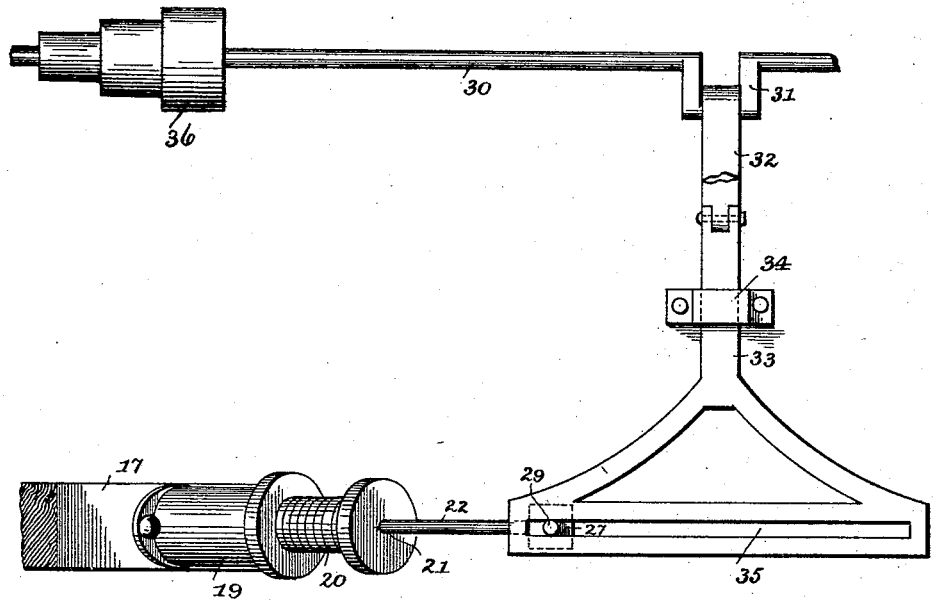
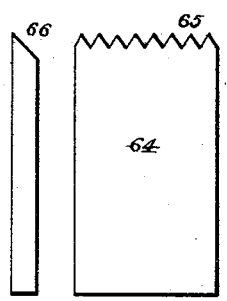
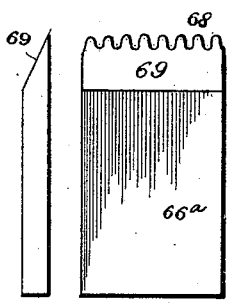
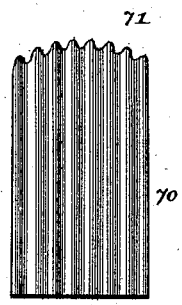
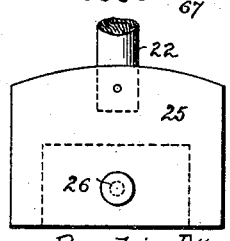
Witnesses  Inventor
Chas. H. Durand  Russell C. Miller
Wm. Bagger  By his Attorneys,
 C. A. Snow & Co.

(No Model.)  R. C. MILLER.  3 Sheets—Sheet 3.
CARVING MACHINE.
No. 479,653.  Patented July 26, 1892.
*Fig. 6.*
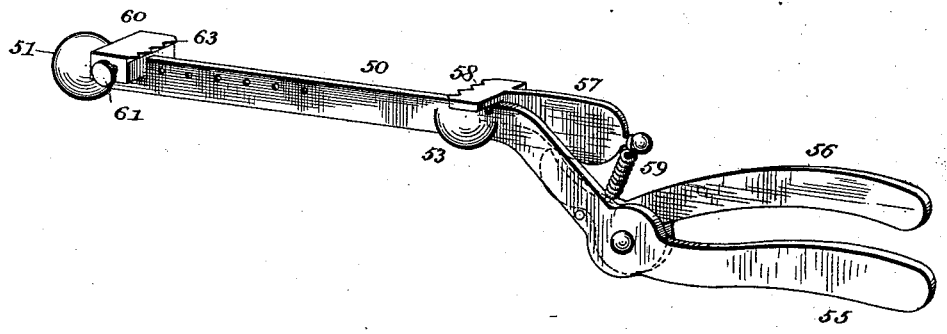
*Fig. 7.*
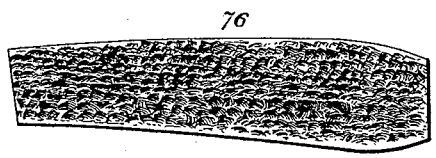
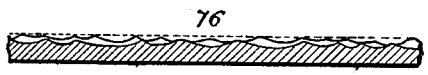
*Fig. 8.*
Witnesses  Inventor
Chas. H. Ourand  Russell C. Miller,
Wm. Bagger  By his Attorneys,
C. A. Snow & Co.

UNITED STATES PATENT OFFICE.

RUSSELL C. MILLER, OF SALISBURY, CONNECTICUT, ASSIGNOR OF TWO-THIRDS TO MORGAN TYLER AND WILLIAM W. KEYWORTH, OF SAME PLACE.

CARVING-MACHINE.

SPECIFICATION forming part of Letters Patent No. 479,653, dated July 26, 1892.

Application filed April 30, 1891. Serial No. 391,116. (No model.)

*To all whom it may concern:*

Be it known that I, RUSSELL C. MILLER, a citizen of the United States, residing at Salisbury, in the county of Litchfield and State of Connecticut, have invented a new and useful Carving-Machine, of which the following is a specification.

This invention relates to machines for carving different materials—such as ivory, bone, horn, shell, wood, or metal—for handles or grips for cutlery, guns, revolvers, fish-poles, and implements of all kinds; and it has for its object to provide a machine of this class which shall be simple in construction, durable, and efficient in operation and by means of which carving may be produced of that class which is known as "machine-stag" of a superior quality and in a rapid and economical manner.

With these ends in view the invention consists in the improved construction, arrangement, and combination of parts, which will be hereinafter fully described, and particularly pointed out in the claims.

In the drawings hereto annexed, Figure 1 is a side elevation, partly in section, of a carving-machine constructed in accordance with my invention, parts of the frame and the lower end of the supporting device having been broken away. Fig. 2 is a side elevation of the lower end of the supporting device. Fig. 3 is a plan view of a portion of the machine. Fig. 4 is a face and side view of one of the cutters used. Fig. 4$^a$ is a similar view and a cross-section centrally through a corrugated cutter. Fig. 4$^b$ is a side and central cross-sectional view of a modified corrugated cutter. Fig. 4$^c$ is a side elevation of a bent cutter. Fig. 5 is a plan view of the cutter-holder. Fig. 6 is a detail view of the work-supporting device. Fig. 7 is a plan and sectional view of a machine-stag handle carved by my improved machine. Fig. 8 is a plan and sectional view of a similar handle carved by hand.

Like numerals of reference indicate like parts in all the figures.

The frame of the machine is provided with suitable bearings for a longitudinal shaft 1, carrying at one end a spiral thread or worm 2, meshing with a worm-gear 3, which in turn transmits motion to a spur-wheel 4, one of the spokes of which has a radial adjustable crank or wrist-pin 5, which is connected pivotally with one end of a pitman 6, which is composed of two parts 7 and 8, each provided with a slot and connected adjustably by means of the bolts 9, in order that the length of said pitman may be adjusted to suit the adjustment of the crank or wrist-pin 5 with relation to the center of the wheel 4. It will be seen that the length of the stroke of the pitman 6 may be regulated by the adjustment of the wrist-pin 5.

The frame is provided with a longitudinal guide 10, which is supported under a suitable top beam or horizontal arm 11 by means of springs 12, which permit the said guide to yield to some extent in an upward direction, as well as laterally to a certain degree. The springs 12 may be ordinary coiled springs, rubber cushions, or any other well-known yielding or elastic supporting devices which shall permit the guide 10 to yield to a limited extent in an upward direction, while the said springs also serve to support the said guide. Mounted slidingly in the guide 10 is the cross-head 13, which is provided near its rear end with a downwardly-extending segmental arm 14, which is connected adjustably by a clamping-screw 15 with a similar segment 16, extending upwardly from an arm 17, which is pivoted at 17$^a$ to the under side of the cross-head 13, near the front end of the latter. The segments 14 and 16 are provided with slots 18 to receive the connecting-screw 15, thus permitting the arm 17 to be adjusted at various angles to the cross-head and the lower end of said arm to be raised or lowered, as may be desired.

At the lower end of the arm 17, upon the upper side of said arm, is mounted a casing or hollow cylinder 19, the upper end of which is interiorly screw-threaded to receive a combined adjusting-screw and bearing 20, which latter is longitudinally perforated, as shown at 21, to receive the cutter rod or shaft 22. The latter is provided within the casing or hollow cylinder 19 with an annular flange 23 to receive the pressure of a spring 24, which is arranged in said socket between the flange 23 and the screw 20, which latter may be adjusted to regulate the tension of the spring. The lower end of the cutter-rod carries the socketed head 25, having a set-screw 26, by means of which the cutting-tool may be secured in the socket thereof. The upper end of the cutter-rod has a collar 27, adjustable by a set-screw 28, and is provided with an upwardly-extending finger 29.

The frame of the machine is provided with suitable bearings for a shaft 30, arranged parallel to the main shaft 1 and having a crank 31, which is connected by a pitman 32 with a slide 33, confined to the frame by means of a guide-strap 34 and having a longitudinal slot 35 to receive the finger 29, extending upwardly from the cutter-rod, said slot 35 being of sufficient length to admit of the extreme longitudinal movement of the cross-head 13, carrying the cutter-rod. The crank-shaft 30 has a cone-pulley 36, connected by a belt or band 37 with a cone-pulley 38 upon the main shaft 1, from which motion is thus transmitted to the said crank-shaft, which in turn imparts a reciprocating motion to the sliding frame 33, having the slot 35, whereby an oscillating or vibrating motion is imparted to the cutter-rod while the latter is in operation. A spring 39 is interposed between the arm 17 and the under side of the guide 10. It will be observed at this point that the sectional pitman is loosely connected to one end of the sliding cross-head 13 at 8$^a$; but said pitman may be provided at such point with any suitable joint that, while pivotally connecting the same to the cross-head, will at the same time allow the guide, the cross-head, and cutter-carrying arm to move laterally, or at right angles to the travel of the pitman to give to the movement of the frame 33 and allow the cutting-tool to move back and forth laterally and straight forward and back without affecting or interfering with the action of the crank and its pitman.

40 designates an upright provided near its upper and lower ends with rearwardly-extending arms 41, having perforations 42 to receive the guide-pins 43, between which the supporting-block 44 is adjustably mounted, the guide-pins being adjustable to permit the said supporting-block to be moved in a forward or rearward direction, as may be desired. The lower end of the supporting-block is supported upon a spring 45, resting upon the base of the machine, and it is connected pivotally with a lever 46, pivoted to a lug or bracket 47 and having at its free end an adjusting-screw 48 to limit the extent to which the said lever may be depressed, and consequently regulating the extent to which the supporting-block 44 may be raised by depressing the free end of the lever. A spring-cushion 49 is arranged under the free end of the lever 46. The latter in the drawings hereto annexed has been shown arranged as a foot-lever; but I desire it to be understood that it may, if preferred, be arranged to be operated by hand.

50 designates the work-holder, which consists of a block or plate having at its front end a spherical head or ball 51, mounted in a suitable socket 52 upon the supporting-block 44. The work-holder is also provided on its under side, near its front end, with a semi-spherical supporting-lug 53, resting upon the upper side of the supporting-block which latter between the head 51 and the supporting-lug 53 of the work-holder is provided with a transverse recess 54 to receive the shavings, which may thus be disposed of without interfering with the work. The work-holder is provided at its rear end with a handle 55 and with an angle-lever 56, the long arm of which forms a handle lying above the handle 55 and capable of being grasped with the latter. Suitably pivoted to the work-holder at a point above the supporting-lug 53 is a dog or pawl 57, provided at its front end with teeth or points 58 and having its rear end connected with the body of the work-holder by a coiled spring 59. The short arm of the angle-lever is adapted to press against the under side of the rear end of the dog 57, so that by depressing the handle of said angle-lever the dog or pawl may be turned upon its pivot and the teeth or points 58 be thrown in a forward and downward direction. 60 designates a block or slide, which is mounted adjustably upon the work-holder by means of a transverse pin or bolt 61, adapted to engage any one of a series of transverse perforations in the body of the work-holder. The rear side or edge of the adjustable block 60 is provided with teeth or points 63, facing the teeth 58 of the pawl or dog 57. It will be seen that by placing the blank which is to be carved upon the work-holder between the sliding block 60 and the pawl 57, the sliding block having been previously adjusted to the length of the blank, the latter may be held securely by simply grasping the handle 55 and the long arm of the lever 56 and depressing the latter, thus operating the dog or pawl 57 to cause the teeth 58 and 63 to engage the ends of the blank. While the latter is thus held the operator may tilt the work-holder to either side, so as to expose the edges of the blank to the action of the cutting-tool. Owing to the manner herein described of mounting the work-holder by the ball-and-socket joint 51 52 the heel end of said work-holder may also be adjusted transversely and vertically by the operator, who is thus in full control of the work and capable of governing the action of the cutters to the utmost extent.

In Figs. 4, 4$^a$, 4$^b$, and 4$^c$ in the drawings I have shown various forms of cutters which may be used in connection with my invention. The cutter 64 (illustrated in Fig. 4) is provided with a series of sharp-pointed teeth 65, the points of which are beveled, as shown at 66, all of said points being the same length. The cutter 66$^a$ (illustrated in Fig. 4$^a$) is longitudinally corrugated, as shown at 67, and the cutting-teeth 68 are formed by beveling one side of the tool, as shown at 69. The cutter 70, as illustrated in Fig. 4$^b$, is constructed like the cutter 66, with the exception that the end which is beveled to form the teeth 71 is rounded and the body has parallel faces, as will be clearly seen in the drawings. The cutter 74 (illustrated in Fig. 4ᵉ) is bent at the end having the teeth 75, which are similar to the teeth 65 of the cutter 64, so that the same will be caused to assume a position which is practically at right angles to the work that is to be done.

The operation of my invention will be readily understood from the foregoing description, taken in connection with the drawings hereto annexed. The machine may be driven by any suitable power, which may be transmitted to the main shaft 1 in any convenient manner. From the wheel 4 a longitudinally-reciprocating motion is imparted to the cross-head carrying the carver, and the latter receives at the same time a comparatively rapid short oscillating or vibrating motion through the reciprocating slide 33 from the crank-shaft 30. A third distinct spring movement is admissible, owing to the springs 12, which support the guide in which the cross-head is mounted, the spring 24 in the casing of the cutter-rod, and the spring which supports the supporting-block 44. These several springs combine to give a yielding motion to the tool, as well as to the material which is being operated upon. The latter is, moreover, capable of being manipulated during the operation of the machine by means of the holder in which it is mounted. The spring movement referred to is caused by the vibrations of both the spring-supported block 44 and the spring-suspended cutting devices. It will be readily seen that as the machine is in its longitudinal lateral motion the cutting-tool is necessarily moved along in waves; but, furthermore, it will be also seen that this combined movement of the machine will set all the springs in vibration, which will of course have the tendency to make this movement irregular, while at the same time causing both the block 44 and the cutting-tool to intermittently and irregularly spring to and away from each other, coming sharply in contact and then jumping apart. This combination of movements causes the handle-blank to be irregularly indented continuously and at irregular depths, as already pointed out and noted. It will be seen that by this machine the tool cuts the full length of the work by a single adjustment of the same, the operation being completed, usually, by a single passage of the tool over the blank. In this respect the product of the machine is essentially different from articles of this class heretofore manufactured, as will be readily seen by an inspection of Figs. 7 and 8 of the drawings, the former of which shows at 76 the indentation-carvings formed by my improved machine, while in Fig. 8, at 77, is shown the separate and independent cuts formed by the ordinary hand or machine work. It will also be noticed that by my improved machine the longitudinal grooves or indentations are made of irregular depth throughout their lengths, thus making a neater and more desirable product than it has been possible heretofore to produce by machinery.

Having thus described my invention, what I claim is—

1. In a machine of the class described, the combination of a reciprocating cross-head, a suitable guide for the same, springs interposed between said guide and its suppport, an arm pivoted to and connected adjustably with said cross-head, and the cutting-tool mounted at the free end of said arm, substantially as set forth.

2. In a machine of the class described, the combination of the reciprocating cross-head, the yieldingly-supported guide for the same, an arm pivoted to and connected adjustably with said cross-head, the socket at the outer end of said arm, and the tool-holder mounted yieldingly in said socket, substantially as set forth.

3. In a machine of the class described, the combination of the reciprocating cross-head, the yieldingly-supported guide for the same, the arm pivoted to and connected adjustably with said cross-head, the tool-holder or cutter-rod journaled at the free end of said arm, and means for imparting an oscillating motion to said cutter-rod, substantially as set forth.

4. The combination of the reciprocating cross-head having a slotted segment, the arm pivoted to said cross-head and having a slotted segment, the clamping-screw connecting the said slotted segments, and the cutter-rod mounted at the free end of said arm, substantially as set forth.

5. The combination of the cross-head having the adjustable arm, the socket at the free end of said arm, the adjusting-screw and bearing mounted in said socket, the cutter-rod extending through said socket and screw and having an annular flange within the socket, the spring arranged in the socket between said flange and the screw, the tool-holder at the lower end of the cutter-rod, and means for imparting to the latter an oscillating or vibrating motion, substantially as set forth.

6. The combination, with the cutter-rod mounted yieldingly in a socket, as herein described, of the collar mounted at the upper end of said rod and having an upwardly-extending finger, a transversely-reciprocating slide having a longitudinal slot receiving said finger, thereby imparting to the cutter-rod an oscillating or vibratory movement, and means for moving the finger in said slot, substantially as set forth.

7. The combination, with the reciprocating cross-head, of the transversely-reciprocating slide having a longitudinal slot, the yieldingly-supported guide for the cross-head, the arm hinged to and connected adjustably with the latter, the socket at the free end of said arm having an adjusting-screw and bearing mounted therein, the cutter-rod extending through said socket and adjusting-screw and bearing and having an annular flange, a spring arranged in the socket and bearing against said flange, a tool-holder at the lower end of the cutter-rod, the collar mounted adjustably at the upper end of the latter, and the finger extending upwardly from said collar through the longitudinal slot in the transversely-reciprocating slide, substantially as and for the purpose set forth.

8. In a machine of the class described, the combination, with the cutter arranged to have a longitudinally-reciprocating and an oscillating or vibrating motion, of the supporting-block mounted adjustably between arms extending forwardly from a suitable upright, a spring supporting said block, a lever connected pivotally with the latter, a spring arranged under the free end of said lever, and an adjusting-screw or gage-screw mounted in the latter to regulate the extent to which the supporting-block may be raised by said lever, substantially as set forth.

9. The combination, with the supporting-block, of the work-holder connected with said block by a ball-and-socket joint, substantially as set forth.

10. The combination, with the supporting-block having a suitable socket, of the work-holder having a spherical head or ball fitted in said socket and provided at its free end, on its under side, with a semi-spherical supporting-lug, substantially as and for the purpose set forth.

11. The combination, with the vertically-adjustable supporting-block, of the work-holder having a spherical head engaging a socket upon said supporting-block and provided with a semi-spherical supporting-lug, the toothed block mounted adjustably at one end of said work-holder, the toothed dog pivoted at the opposite end of the same, a spring attached to the heel end of said dog, and an angle-lever having one arm extended under said dog, the other arm of said lever being extended over the handle of the work-holder, substantially as set forth.

12. In a machine of the class described, the combination, with the cutter mounted to oscillate in a socket carried by a longitudinally-reciprocating cross-head and suitable mechanism for operating said cross-head and cutter, of the vertically-adjustable supporting-block, and the work-holder having a spherical head mounted in a ball-socket upon said supporting-block, and yielding supports for said block, for the guide in which the reciprocating cross-head is mounted, and for the cutter-rod, substantially as and for the purpose set forth.

In testimony that I claim the foregoing as my own I have hereto affixed my signature in presence of two witnesses.

RUSSELL C. MILLER.

Witnesses:
MORGAN TYLER,
THOS. L. NORTON.